United States Patent
Corless

(10) Patent No.: US 6,721,793 B1
(45) Date of Patent: Apr. 13, 2004

(54) INTELLECTUAL PROPERTY OVER NON-INTERNET PROTOCOL SYSTEMS AND NETWORKS

(75) Inventor: Peter P. Corless, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/568,649

(22) Filed: May 10, 2000

(51) Int. Cl.⁷ .......................... G06F 15/16; H04N 7/167
(52) U.S. Cl. ........................ 709/229; 380/201; 380/202
(58) Field of Search ................................ 709/229, 201; 380/201, 202; 713/200, 151, 182

(56) References Cited

U.S. PATENT DOCUMENTS

| | | | | |
|---|---|---|---|---|
| 5,892,900 A | | 4/1999 | Ginter et al. ................ | 395/186 |
| 5,910,987 A | | 6/1999 | Ginter et al. .................. | 380/24 |
| 5,915,019 A | | 6/1999 | Ginter et al. .................. | 380/4 |
| 5,917,912 A | | 6/1999 | Ginter et al. .................. | 380/24 |
| 5,920,861 A | | 7/1999 | Hall et al. ....................... | 707/9 |
| 5,943,422 A | | 8/1999 | Van Wie et al. ................ | 380/9 |
| 5,949,876 A | | 9/1999 | Ginter et al. .................. | 380/4 |
| 5,982,891 A | | 11/1999 | Ginter et al. .................. | 380/4 |
| 5,983,351 A | * | 11/1999 | Glogau ........................ | 713/201 |
| 6,052,780 A | * | 4/2000 | Glover ........................ | 713/193 |
| 6,119,229 A | * | 9/2000 | Martinez et al. ............. | 713/200 |
| 6,157,947 A | * | 12/2000 | Watanabe et al. ............ | 709/217 |
| 6,170,014 B1 | * | 1/2001 | Darago et al. ............... | 709/229 |
| 6,286,036 B1 | * | 9/2001 | Rhoads ........................ | 709/217 |
| 6,314,409 B2 | * | 11/2001 | Schneck et al. .............. | 705/54 |
| 6,385,596 B1 | * | 5/2002 | Wiser et al. .................. | 705/51 |
| 6,408,331 B1 | * | 6/2002 | Rhoads ........................ | 709/217 |
| 6,418,421 B1 | * | 7/2002 | Hurtado et al. ............... | 705/54 |
| 6,466,571 B1 | * | 10/2002 | Dynarski et al. ............ | 370/352 |
| 6,564,253 B1 | * | 5/2003 | Stebbings .................... | 709/217 |
| 2001/0037460 A1 | * | 11/2001 | Porrcari ..................... | 713/201 |
| 2001/0039587 A1 | * | 11/2001 | Uhler et al. ................. | 709/229 |

* cited by examiner

*Primary Examiner*—Krisna Lim

(57) ABSTRACT

A method and system thereof for implementing and controlling the electronic distribution of intellectual property using protocols other than the Internet Protocol. A request for intellectual property is codified according to a protocol other than an Internet Protocol. A service is performed to provide an electronic version of the intellectual property in response to the request, and a service is performed to provide an electronic version of terms for using the intellectual property. These requests and responses are coupled between an intellectual property management system and non-Internet Protocol based networks and/or systems. Thus, software product and service orders are translated into deliverables that are coupled over non-Internet protocol systems.

21 Claims, 11 Drawing Sheets

INTELLECTUAL PROPERTY OVER NON-INTERNET PROTOCOL SYSTEMS AND NETWORKS

TECHNICAL FIELD

The present invention relates to the electronic transfer of information, particularly intellectual property, over computer system networks. More specifically, the present invention pertains to a mechanism for implementing and controlling the negotiation and exchange of intellectual property electronically, for example over the Internet.

BACKGROUND ART

Intellectual property can be considered in terms of either its "embodiments" or its "representations." Generally, an embodiment of an intellectual property is the property itself, while a representation of the intellectual property can be data or metadata either describing or pointing to the property.

For example, intellectual properties such as real-time human communications, stored and forwarded messages, documents or collections, dynamic or persistent data structures and databases, interpretable scripts, source code, and partially or fully compiled programs and applications, as well as other intellectual properties generally referred to as "content," are often described as an embodiment of the intellectual property. Embodiments of intellectual property can also be theoretical or abstract concepts that are exemplified or documented as a specific form of content.

Legal rights, contracts, agreements or other assertions can be embodied in the form of content, but are not the embodiment of the intellectual property itself. Instead, these are considered representations of the intellectual property. Some intellectual properties, such as a deed or title to a home, can be representations of physical or real properties.

Intellectual properties are becoming more and more central to the world economy. In an information economy, discrete or aggregate values are placed on intellectual properties, and the markets for general or specific applications of these properties are huge. For example, the software industry, which has embodiments of intellectual properties in software products and services, and representations of property rights in licenses, legal contracts and agreements, copyrights, trademarks and patents, currently has annual sales rates of over $135 billion per year.

Increasingly, the Internet (or World Wide Web) is the medium of transmission of intellectual properties such as software products and the like. The Internet uses the Internet Protocol to frame, route, and reassemble digital messages. The transaction of intellectual property is a general transfer of data and data communications over the Internet; intellectual property such as software is simply treated as a bit stream in Internet Protocol. On top of the Internet Protocol are specialized transport layer services, such as HTTP (Hypertext Transfer Protocol) or SMTP (Simple Mail Transfer Protocol). Within these, many messages are encoded in markup languages such as XML (Extensible Markup Language), the World Wide Web Consortium (W3C) meta-markup language based on SGML (Standard Generalized Markup Language).

With regard to the protection of intellectual property, the prior art takes a defensive posture that is focused on guarding the intellectual property against unauthorized access, duplication and use. Limitations are placed on the use and distribution of a piece of intellectual property, and various means are used to attempt to enforce these limitations. Oftentimes, the limitations can be easily circumvented, and so enforcement can be difficult and therefore is mostly ineffective.

In addition, while in some cases the prior art may take advantage of the Internet for delivery of intellectual property such as software, the prior art is still encumbered by more traditional mechanisms for conducting the legal and commercial aspects of intellectual property transactions. For example, purchase orders, terms and conditions, license agreements and the like must be negotiated, written, reviewed and approved. These more traditional mechanisms can cause delay in the delivery and use of the intellectual property by a purchaser or licensee, and delay in the receipt of payments or royalties due to a seller or licensor.

However, many proprietary computer systems and networks do not communicate using the Internet Protocol. What is needed is a method and/or system that allows for communications relating to intellectual property over computer systems and networks that do not communicate using the Internet Protocol. Also, a method and/or system is needed that satisfies the above need and that provides a mechanism to allow intellectual property transactions, including the proper negotiation and exchange of intellectual property, over computer systems and networks that do not communicate using the Internet Protocol. The present invention provides a novel solution to the above needs.

DISCLOSURE OF THE INVENTION

The present invention provides a method and system thereof that allows for communications relating to intellectual property over computer systems and networks that do not communicate using the Internet Protocol. Also, the method and system of the present invention provides a mechanism to allow intellectual property transactions, including the proper negotiation and exchange of intellectual property, over computer systems and networks that do not communicate using the Internet Protocol.

The present embodiment of the present invention can be used to assert information regarding the rights, responsibilities and other terms of use of intellectual property within an IP over IP framework over computer systems and networks that do not communicate using the Internet Protocol. The present invention also allows interrogation of that information and responds to those interrogations over computer systems and networks that do not communicate using the Internet Protocol. In addition, the present invention further allows for storage and transport of the intellectual property and the information regarding the rights, responsibilities and other terms of use of intellectual property over computer systems and networks that do not communicate using the Interned Protocol.

In one embodiment of the present invention a method and system thereof is disclosed for implementing and controlling the electronic distribution of intellectual property using Internet Protocol (e.g., an "IP over IP engine"). This method and system is well adapted for transacting intellectual property related transactions using the Internet protocol. In the present embodiment of the present invention, a method and system is disclosed that allows for conducting these same intellectual property transactions over computer systems and networks that do not communicate using the Internet Protocol.

In the present embodiment, IP to non-IP modules are used to provide IP to non-IP communication. In the present embodiment, an IP to non-IP Protocol gateway module is provided that acts as an interface for coupling to a computer system and/or network that does not communicate using the Internet Protocol.

In one embodiment, a message encapsulation and transportation module is described that allows for the encapsulation and transportation of communications over IP Protocols. In the present embodiment, XML messages are encapsulated and transported using the message encapsulation and transportation module.

The present invention also includes an IP to non-IP module that creates non-XML embodiments and representations. These non-XML representations are used to communicate with computer systems and networks that cannot process XML instructions and data.

In the present embodiment, a request for intellectual property is codified according to a markup language (e.g., Extensible Markup Language). The request is parsed into a multiplicity of objects, each object corresponding to a service to be performed to respond to the request. A service is performed to provide an electronic version of the intellectual property in response to the request, and a service is performed to provide an electronic version of terms for using the intellectual property. Thus, in accordance with the present embodiment of the present invention, software product and service orders are translated into deliverables that are transmitted over the computer system and/or network that does not communicate using the Internet Protocol.

Thus, the present invention provides a method and system that allows for communications relating to intellectual property over computer systems and networks that do not communicate using the Internet Protocol. Also, the method and system of the present invention provides a mechanism to allow intellectual property transactions, including the proper negotiation and exchange of intellectual property, over computer systems and networks that do not communicate using the Internet Protocol.

In its various embodiments, the services performed in accordance with the present invention include a registration service, an authorization key service, an authentication service, a dispatch service, and a digital license service. In other embodiments, a digital rights service or a digital feature format service can be performed.

These and other objects and advantages of the present invention will become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "codifying," "parsing," "performing," "providing" or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

Figure 1A:
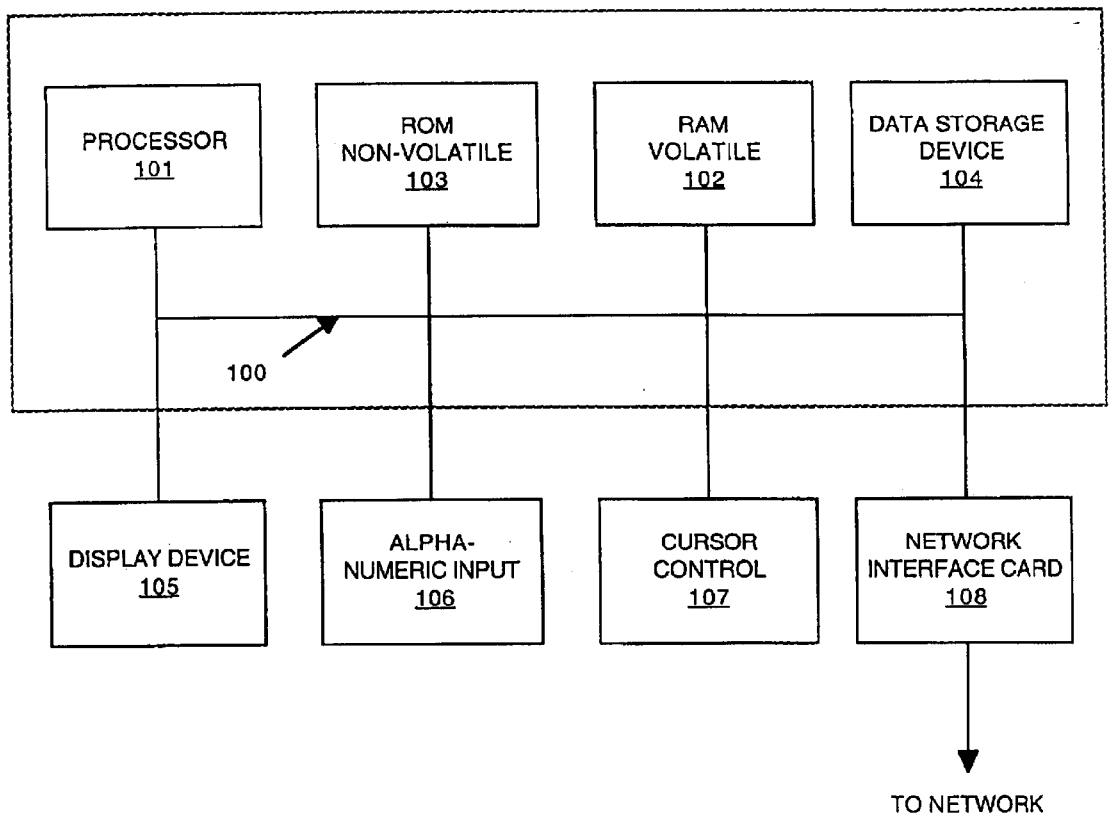
FIG. 1A is a block diagram of an exemplary computer system upon which embodiments of the present invention may be practiced.

Refer now to FIG. 1A that illustrates an exemplary computer system 190 upon which embodiments of the present invention may be practiced. In general, computer system 190 comprises bus 100 for communicating information; processor 101 coupled with bus 100 for processing information and instructions; random access (volatile) memory (RAM) 102 coupled with bus 100 for storing information and instructions for processor 101; read-only (non-volatile) memory (ROM) 103 coupled with bus 100 for storing static information and instructions for processor 101; data storage device 104 such as a magnetic or optical disk and disk drive coupled with bus 100 for storing information and instructions; an optional user output device such as display device 105 coupled to bus 100 for displaying information to the computer user; an optional user input device such as alphanumeric input device 106 including alphanumeric and function keys coupled to bus 100 for communicating information and command selections to processor 101; and an optional user input device such as cursor control device 107 coupled to bus 100 for communicating user input information and command selections to processor 101. Furthermore, a network interface card (NIC) 108 is used to couple computer system 190 onto, for example, a client-server computer system network. In such a network, computer system 190 can exemplify a client computer system and/or a server computer system.

Display device 105 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 1B:
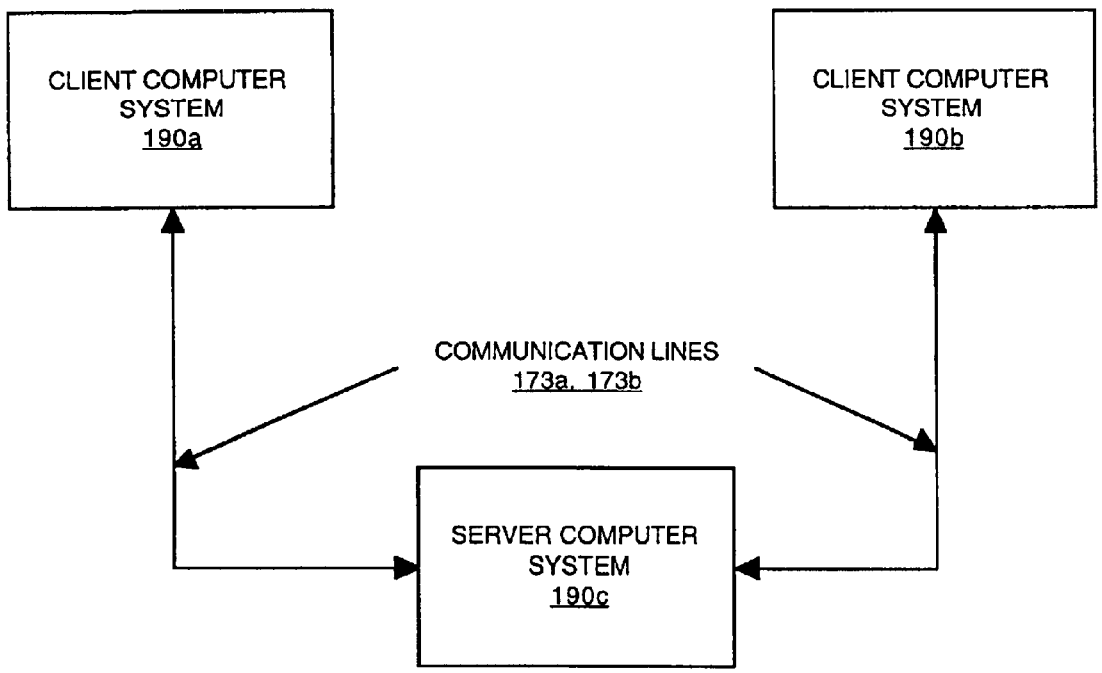
FIG. 1B is a block diagram illustrating an exemplary client-server computer system network upon which embodiments of the present invention may be practiced.

FIG. 1B is a block diagram illustrating an exemplary client-server computer system network 170 ("network 170") upon which embodiments of the present invention may be practiced. Network 170 may be a communication network located within a firewall of an organization or corporation (an "Intranet"), or network 170 may represent a portion of the World Wide Web or Internet. Client (or user) computer systems 190a and 190b and server computer system 190c are communicatively coupled via communication lines 173a and 173b; the mechanisms for coupling computer systems over the Internet or over Intranets are well-known in the art. This coupling can be accomplished over any network protocol that supports a network connection, such as Internet Protocol, TCP (Transmission Control Protocol), NetBIOS, IPX (Internet Packet Exchange), and LU6.2, and link layers protocols such as Ethernet, token ring, and ATM (Asynchronous Transfer Mode). Alternatively, client computer systems 190a and 190b can be coupled to server computer system 190c via an input/output port (e.g., a serial port) of server computer system 190c; that is, client computer systems 190a and 190b and server computer system 190c may be non-networked devices. Though network 170 is shown to include one server computer system 190c, it is appreciated that network 170 can include more than one server computer system 190c.

A method and system thereof for controlling the identification, negotiation, establishment, and transaction of intellectual properties (embodiments and representations) over the Internet is provided in the copending patent application filed concurrently herewith, assigned to the assignee of the present invention, entitled "Intellectual Property Over Internet Protocol Framework," by Peter Corless, with Ser. No. 09/568,647, hereby incorporated by reference. The reference application provides the framework, referred to as the "IP over IP" framework, for facilitating the legal and commercial aspects of intellectual property transactions.

Figure 2:
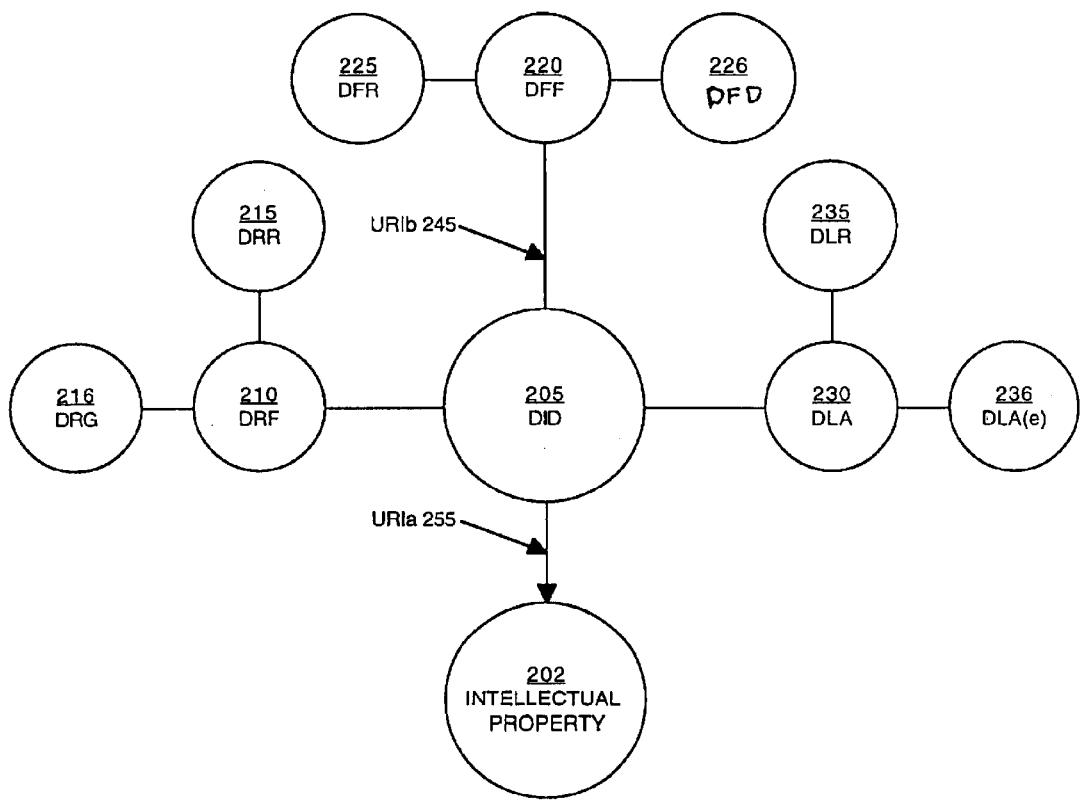
FIG. 2 shows the framework of an intellectual property management system in accordance with one embodiment of the present invention.

FIG. 2 shows the framework of an intellectual property management system 200 (an intellectual property over Internet Protocol framework, or "IP over IP" framework) in accordance with one embodiment of the present invention. Intellectual property management system 200 can be implemented over the Internet (e.g., World Wide Web), over an Intranet, or using networked devices or non-networked devices that are communicatively linked.

Intellectual property 202 can be either a representation or an embodiment of an intellectual property. In accordance with the present embodiment of the present invention, intellectual property 202 is assigned a unique digital identifier (DID) 205, which serves as a Uniform Resource Identifier (e.g., URIa 255) that points to intellectual property 202.

An electronic link or hyperlink is enabled between DID 205 and other intellectual property elements in order to establish the terms and conditions for accessing, using and distributing intellectual property 202. In one embodiment, different URIs (exemplified by URIb 245) may be used to point to these other intellectual property elements.

In one embodiment, digital rights framework (DRF) 210 is an intellectual property element for describing the rights granted by the intellectual property owner with regard to intellectual property 202. Digital rights request (DRR) 215 describes a request made to the owner for access to intellectual property 202 and for other rights associated with the property. Digital rights grant (DRG) 216 describes the rights granted by the owner of intellectual property 202. Additional information regarding the digital rights framework is provided in the copending patent application filed concurrently herewith, assigned to the assignee of the present invention, entitled "Digital Rights Framework," by Arthur James et al., with Ser. No. 09/569,095, hereby incorporated by reference.

In one embodiment, digital feature format (DFF) 220 is an intellectual property element for describing the features of intellectual property 202. Digital feature request (DFR) 225 describes a query made with regard to these features. DFR 225 can also describe a request to add or remove a feature of intellectual property 202. DFD 226 describes the actual product features in response to the query, or modified features in response to a request for a change in features.

In one embodiment, digital license agreement (DLA) 230 is an intellectual property element describing a licensing agreement for intellectual property 202. Digital license request (DLR) 235 describes a request made for a digital license, and DLA(e) 236 describes an embodiment of the actual digital license agreement made between the intellectual property owner and a licensee. Additional information regarding the digital licensing agreement is provided in the copending patent application filed concurrently herewith, assigned to the assignee of the present invention, entitled "Digital License Agreement," by Arthur James et al., with Ser. No. 09/568,652, hereby incorporated by reference.

Figure 3:
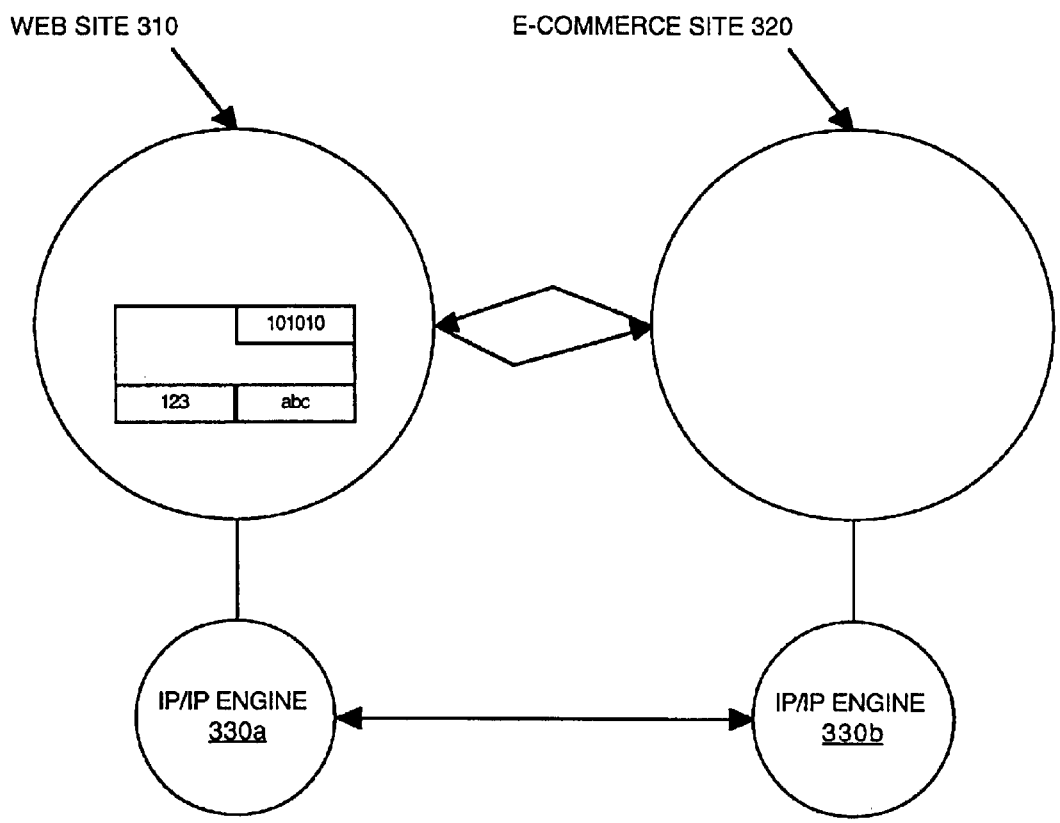
FIG. 3 is diagram exemplifying an interface between Internet sites in accordance with one embodiment of the present invention.

With reference to FIG. 3, the interface between Web site 310 and e-commerce site 320 is implemented and controlled using a software-based "engine" referred to as an "IP over IP engine" (intellectual property over Internet Protocol engine) (e.g., IP/IP engines 330a and 330b). IP/IP engines 330a and 330b provide the methods and processes needed to ensure the proper negotiation and exchange of intellectual property. In accordance with the present invention, IP/IP engines 330a and 330b provide the framework for exchanging intellectual property and associated rights, requests and responses using common programming language and architecture. Additional information regarding the IP over IP engine is provided in the copending patent application filed concurrently herewith, assigned to the assignee of the present invention, entitled "Intellectual Property Over Internet Protocol Engine," by Michelle Brent et al., with Ser. No. 09/568,604 hereby incorporated by reference.

In the present embodiment, Web site 310 of FIG. 3 includes content (e.g., intellectual property 202 of FIG. 2) that is available for sale, license, rent, etc. In one embodiment, Web site 310 and its content (including intellectual property 202) are codified using XML (Extensible Markup Language). In one embodiment, the features of intellectual property 202 are described by DFD 226 (FIG. 2). E-commerce site 320 is communicatively coupled to Web site 310 according to Internet Protocol. The content of e-commerce site 320 includes various intellectual properties for sale, rent, etc., each property perhaps described by text or accompanied by its picture. In one embodiment, e-commerce site 320 and its content are codified using XML.

As described above, in one embodiment, the content of Web site 310 is described by an intellectual property element such as DFF 220 (specifically, DFD 226) of FIG. 2. The owner of the content of Web site 310 grants rights and spells out limitations to the seller or licensee responsible for e-commerce site 320. In one embodiment, the rights and limitations associated with intellectual property 202 are described by an intellectual property element such as DRF 210 (specifically, DRG 216). In one embodiment, these rights and limitations are instead provided by a license described by an intellectual property element such as DLA 230 (specifically, DLA(e) 236).

Figure 4:
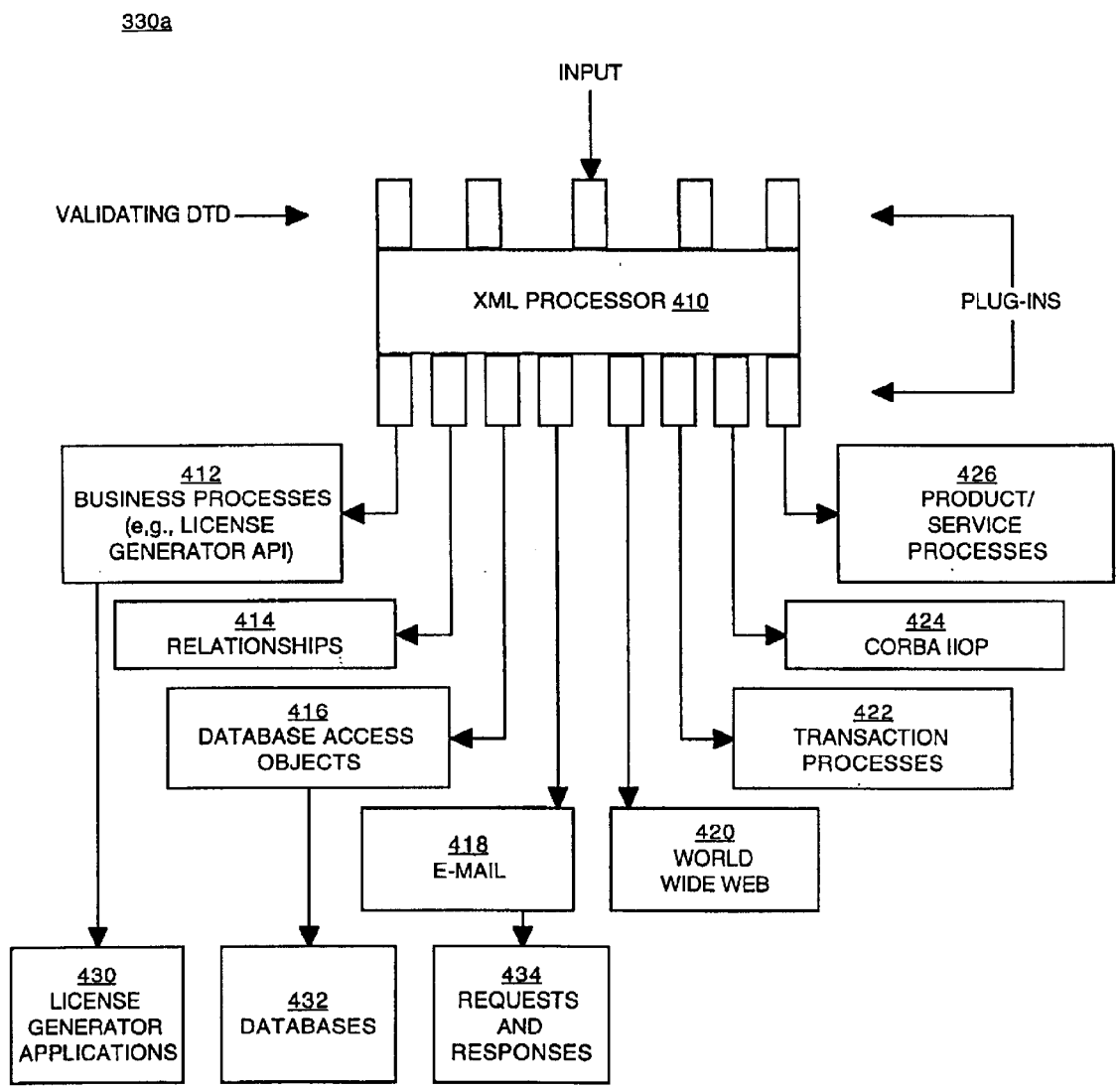
FIG. 4 is a block diagram illustrating one embodiment of a software-based engine (an "IP over IP engine") for implementing and controlling the distribution of intellectual property in accordance with the present invention.

FIG. 4 is a block diagram illustrating one embodiment of a software-based engine (e.g., IP/IP engine 330a) for implementing and controlling the distribution of intellectual property in accordance with the present invention. In the present embodiment, IP/IP engine 330a is executed via computer-readable program instructions stored in a memory unit (e.g., random access memory 102, read-only memory 103, and/or data storage device 104) and executed by processor 101 of computer system 190 (FIG. 1A).

In the present embodiment, IP/IP engine 330a is based on an XML processor 410 with plug-ins on its input side and on its output side. However, it is appreciated that, instead of XML, a different markup language such as SGML or the World Wide Web Consortium (W3C) meta-markup language (based on SGML) could be used for message format and character markup.

On the input side of XML processor 410 are validating document (or data) type descriptors (DTDs). DTDs are known in the art and are used to declare what kinds of tags can be present in a valid instance of the XML language and how the tags are related.

In the present embodiment, the output side of XML processor 410 implements a plurality of plug-ins including plug-ins for: business processes 412, relationships 414, database access objects 416, internet transport types, including e-mail 418, World Wide Web 420, transaction processes 422, CORBA IIOP 424, and product/services processes 426.

The business processes 412 plug-in includes the business logic for product evaluation, sales, registration, support, re-hosting and re-licensing. In one embodiment, business processes 412 includes the application program interface (API) for license generator applications 430 (refer also to FIGS. 6 and 7). With the appropriate business logic, IP/IP engine 330a can perform any number of the following functions: a "requester" function for forming and dispatching messages; a "validator" function for parsing and validating requests and responses (e.g., for form and completeness); an "approver" function for applying business logic to hold and/or forward requests and responses to the appropriate grantor; a "grantor" function for applying business logic to create explicit permit/deny responses to requests; and a "generator" function to generate or publish rights grants, licenses, or other messages or payloads.

The relationships 414 plug-in addresses the relationships between users of the product, and can also provide the relationships between the owners of the intellectual property and their legal rights and limitations with regard to the product. The database access objects 416 plug-in is for accessing and/or writing to databases (e.g., databases 432) containing, for example, product authorization keys (PAKs), registered license keys (RLKs) and DLAs. The e-mail 418 plug-in provides input/output services including sending requests and responses 434 using electronic mail, and similarly World Wide Web (WWW) 420 plug-in is for providing WWW presentations. The transaction process 422 plug-in is for handling transactions. The product/services processes 426 plug-in provides the processes for specific and different, generalized, or policy-based product service entitlements, product contract entitlements, product export entitlements, product registrations, product warranty entitlements, product evaluation entitlements.

In the present embodiment, the CORBA IIOP 424 plug-in refers to the Common Object Request Broker Architecture IIOP protocol. However, it is appreciated that IP/IP engine 330a can employ a number of different Internet Protocol message transport mechanisms, including real time connections using CORBA IIOP protocol, batch processing using Unix remote copy ("rcp"), e-mail protocols (e.g., SMTP, POP, etc.), WWW, HTTP, advanced services on top of HTTP (such as Marimba Castanet services), or any protocol designed for use on an Internet Protocol-based network.

Figure 5:
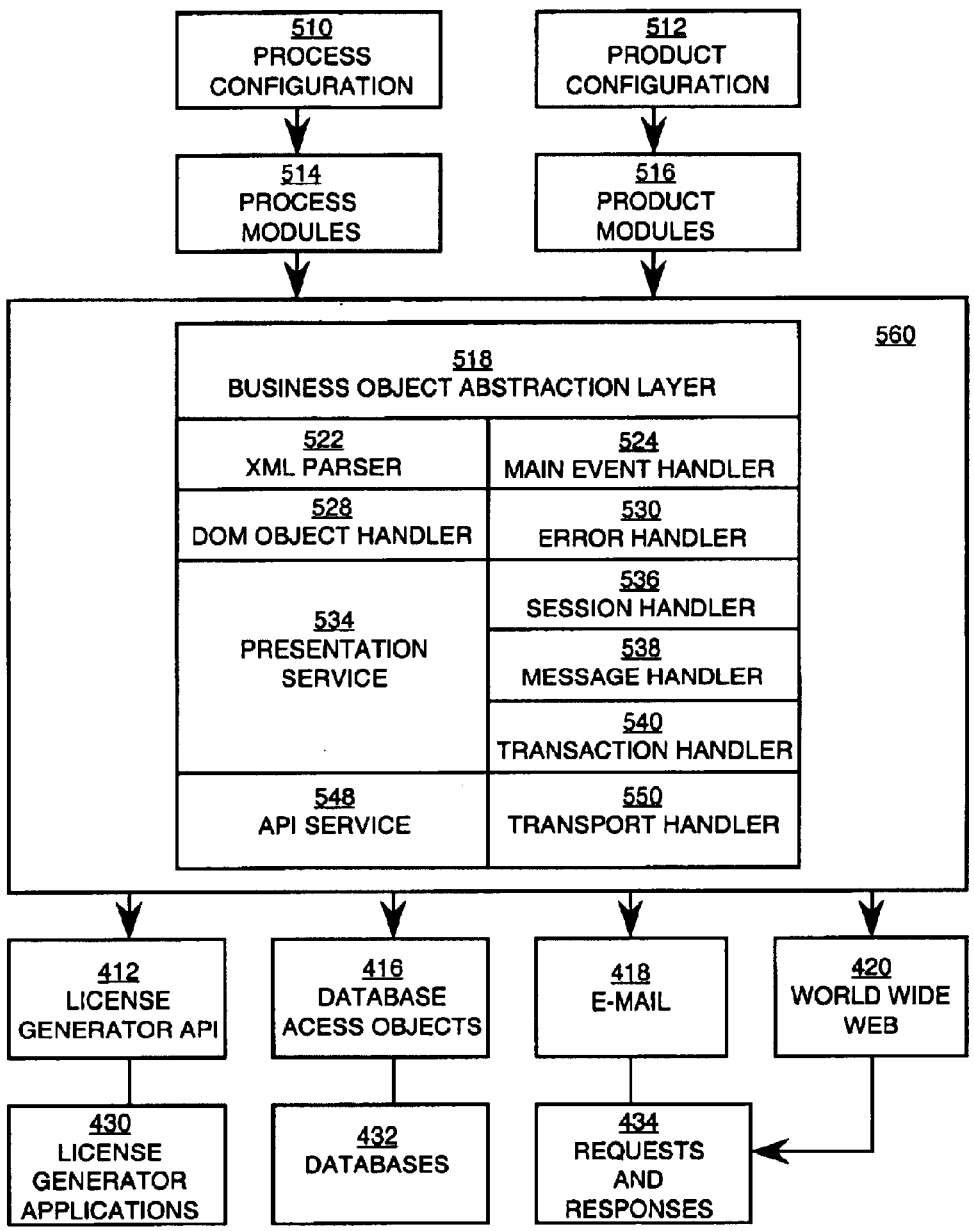
FIG. 5 is a block diagram providing further details of one embodiment of an IP over IP engine in accordance with the present invention.

FIG. 5 is a block diagram providing further details of one embodiment of IP/IP engine 330a in accordance with the present invention. In the present embodiment, the business logic of IP/IP engine 330a is for license agreement generation, storage, requests and responses (e.g., DLA 230 of FIG. 2). However, IP/IP engine 330a is also suitable for employing business logic for digital rights (e.g., DRF 210 of FIG. 2) or digital feature format (e.g., DFF 220 of FIG. 2), as well as for other mechanisms that use the IP over IP framework such as metadata including "Dublin Core" data (e.g., claims of authorship, subject, title, etc.).

With reference to FIG. 5, in the present embodiment, process configuration 510 and product configuration 512 receive XML data input per process or product, respectively. Process modules 514 and product modules 516 include the business processes from the business processes 412 plug-in (FIG. 4).

Continuing with reference to FIG. 5, block 560 represents the core of IP/IP engine 330a. Business object abstraction layer 518 provides the interface with process modules 514 and product modules 516. Session and state information is handled using session handler 536. Input/output handling is implemented using message handler 538 (e.g., for interpreting requests and responses) and transaction handler 540 (e.g., for managing incoming and outgoing messages). XML parser 522, DOM (document object model) 528 and presentation service 534 take an input message in XML and parse it into objects according to the types of services that need to be performed (see FIG. 6). A request is parsed and validated against one of the DTDs. The validating DTDs are implemented using main event handler 524, for handling according to normal rules, and error handler 530, for handling exceptions. Transport handler 550 provides the interface with the message transport mechanism (e.g., real time connections or batch processing using Internet Protocol or the like). API service 548 provides the interface with business processes 412 (e.g., the license generator application program interface).

Figure 6:
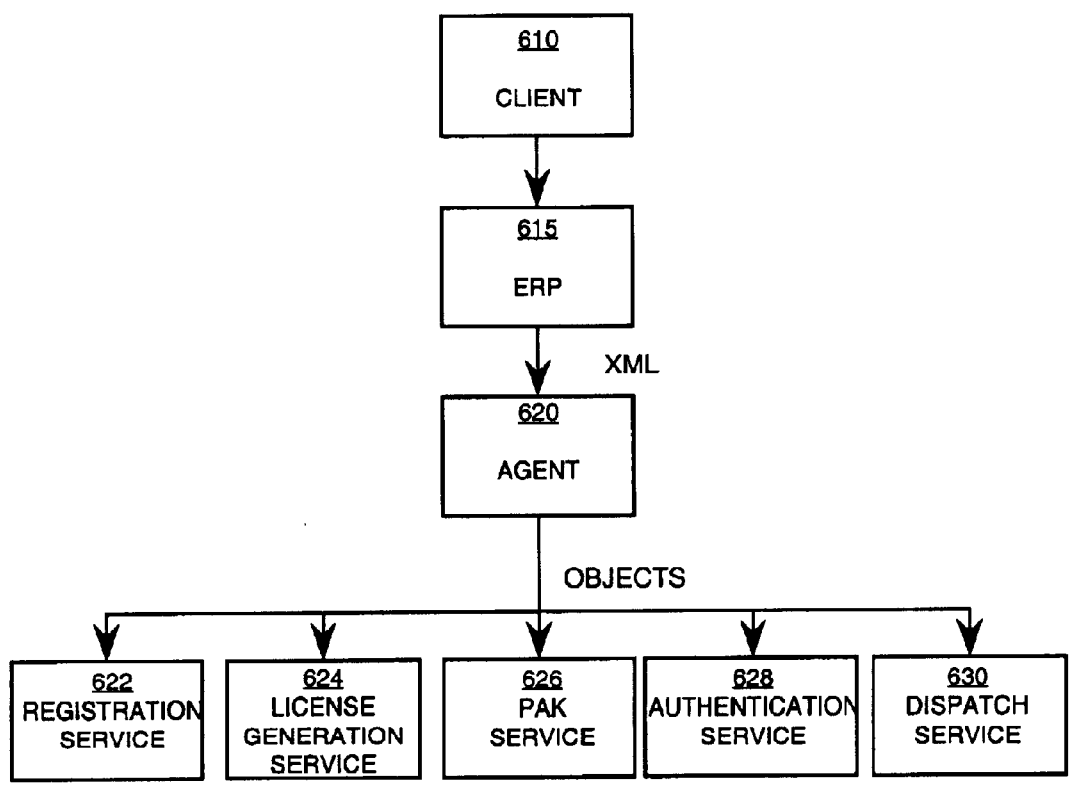
FIG. 6 is a block diagram showing a system for processing a request for an intellectual property in accordance with one embodiment of the present invention.

FIG. 6 is a block diagram showing a system 600 for processing a request for an intellectual property in accordance with one embodiment of the present invention. In the present embodiment, system 600 is executed via computer-readable program instructions stored in a memory unit (e.g., random access memory 102, read-only memory 103, and/or data storage device 104) and executed by processor 101 of computer system 190 (FIG. 1A). Specifically, system 600 is managed using IP/IP engine 330a (FIGS. 4 and 5).

With reference to FIG. 6, client 610 places an order or request (e.g., DLR 235 of FIG. 2) for intellectual property 202 (FIG. 2). In the present embodiment, system 600 is described in the context of product services entitlement processes, although it is appreciated that, as explained in conjunction with FIG. 4, other product/services processes 426 may be implemented in accordance with the present invention. Enterprise resource planner (ERP) 615 receives the request, formats it according to XML, and forwards it to agent 620.

Continuing with reference to FIG. 6, agent 620 receives the request and parses it into objects that correspond to the various services that are needed to fulfill the request. Different services can be provided for different products. In the present embodiment, the services performed include registration service 622, license generation service 624, PAK service 626, authentication service 628, and dispatch service 630. In this embodiment, license generation service 624 is used for generating DLA(e) 236 (FIG. 2). In one embodiment, dispatch service 630 is used to e-mail DLA(e) 236 to client 610, although it is appreciated that transport mechanisms other than e-mail may also be used.

Figure 7:
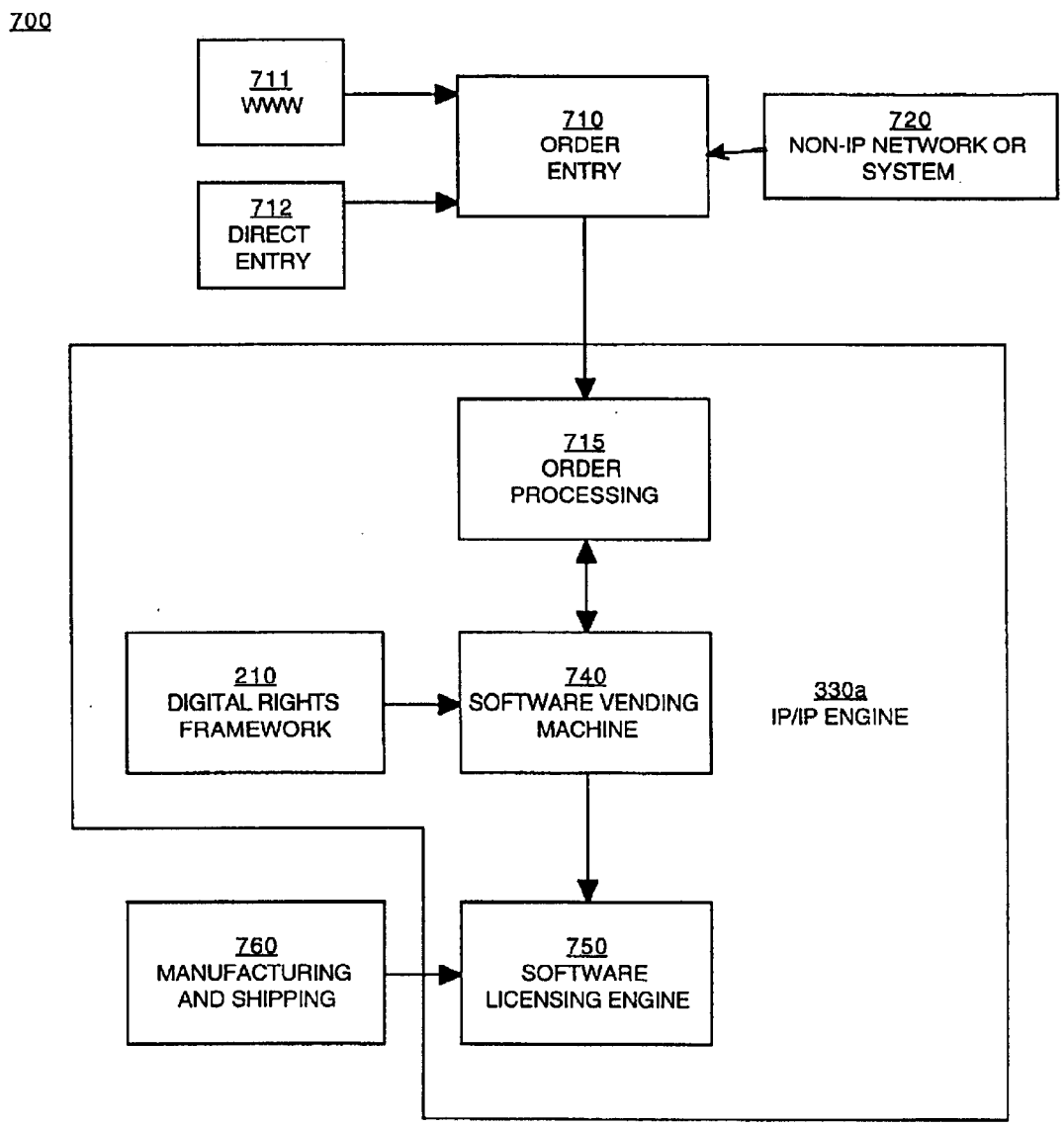
FIG. 7 is a block diagram of a system for processing intellectual property distribution in accordance with one embodiment of the present invention.

The structure and methods described in FIGS. 1–6 describe the present invention in light of conducting intellectual property related communications and transactions over the Internet, or over networks and/or systems that use the Internet Protocol. The present invention is also well adapted for communication over networks and systems that do not use the Internet Protocol. FIGS. 7–9 illustrate an embodiment of the present invention that allows for intellectual property related communications and transactions over networks and systems that do not use the Internet Protocol.

FIG. 7 is a block diagram of a system 700 for processing intellectual property distribution in accordance with one embodiment of the present invention. In the present embodiment, system 700 is executed via computer-readable program instructions stored in a memory unit (e.g., random access memory 102, read-only memory 103, and/or data storage device 104) and executed by processor 101 of computer system 190 (FIG. 1A). In accordance with the present invention, system 700 is managed using IP/IP engine 330a (FIGS. 4 and 5). Specifically, order processing unit 715, digital rights framework 210, software vending machine 740 and software licensing engine 750 are managed by IP/IP engine 330a.

With reference to FIG. 7, order entry unit 710 receives an order or request from a client (e.g., client 830a or client 830b of FIG. 8A) for an intellectual property (e.g., intellectual property 202 of FIG. 2). In one embodiment, the order is placed via a non-IP network or system 720a–720b of FIG. 8A. Alternatively, an order can be placed using the World Wide Web (WWW) 711 (including e-mail) or via direct entry 712 by client 610 (FIG. 6) or by customer support; however, it is appreciated that other mechanisms for placing an order may be used in accordance with the present invention.

Continuing with reference to FIG. 7, the order is forwarded to order processing unit 715. In the present embodiment, orders are processed using batch processing of received XML messages; however, in another embodiment, the XML messages are processed in real time (e.g., live). With batch processing, order processing unit 715 performs a monitoring function to determine if a new order has been received. In one embodiment, order processing unit 715 identifies whether intellectual property 202 can be delivered electronically. In the present embodiment, order processing unit 715 converts the XML message into objects, and forwards the request to software vending machine 740 for resolution.

Digital rights framework 210 accesses information such as the order history and warranty/contract history for intellectual property 202, as well as the rights and limitations associated with the intellectual property (see discussion in conjunction with FIG. 2). Digital rights framework 202 verifies and validates entitlements of client 610 and provides the entitlement information to software vending machine 740.

In the present embodiment, software vending machine 740 receives the request from order processing unit 715. Software vending machine 740 is used to generate a license (e.g., DLA(e) 236 of FIG. 2) via software licensing engine 750. Software vending machine 740 can also change entitlement information and either respond to an error or escalate the error to a human user for resolution. Licensing information (such as a contract number or a serial number) is stored by software vending machine 740 in a database.

Software licensing engine 750 functions with software vending machine 740 to validate requests and generate licenses. Software licensing engine 750 can also be used to reissue a RLK if, for example, the associated intellectual property has been moved from one computer system to another (hence changing its address and in turn invalidating the RLK). In the present embodiment, software licensing engine 750 performs process and product lookups. In one embodiment, manufacturing and shipping information 760 is tied into software licensing engine 750 to provide a mechanism for tracking products still in inventory and products that have shipped.

Figure 8A:
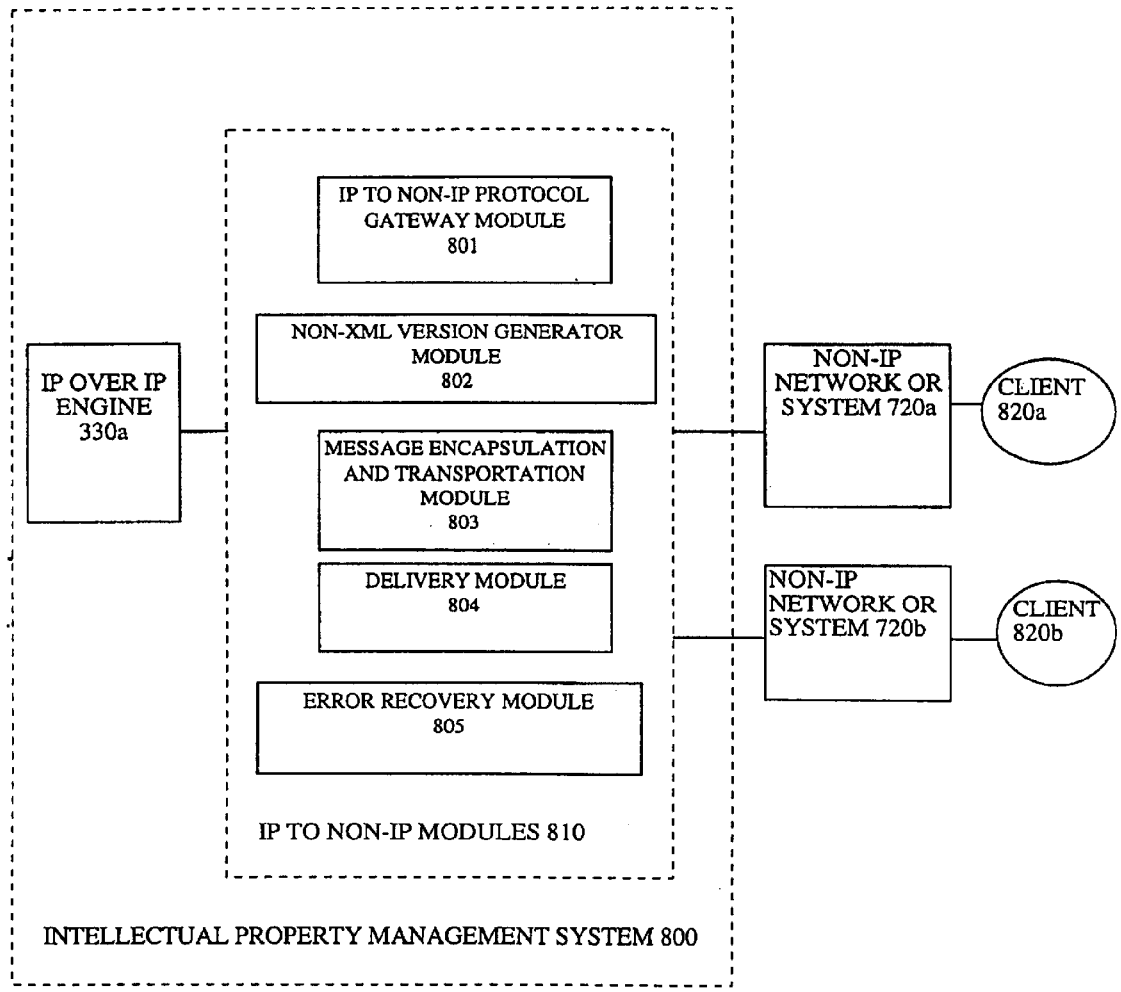
FIG. 8A is a block diagram showing an intellectual property management system that includes an IP over IP engine and IP to non-IP modules and that is coupled to clients via non-IP networks or systems in accordance with one embodiment of the present invention.
Figure 9:
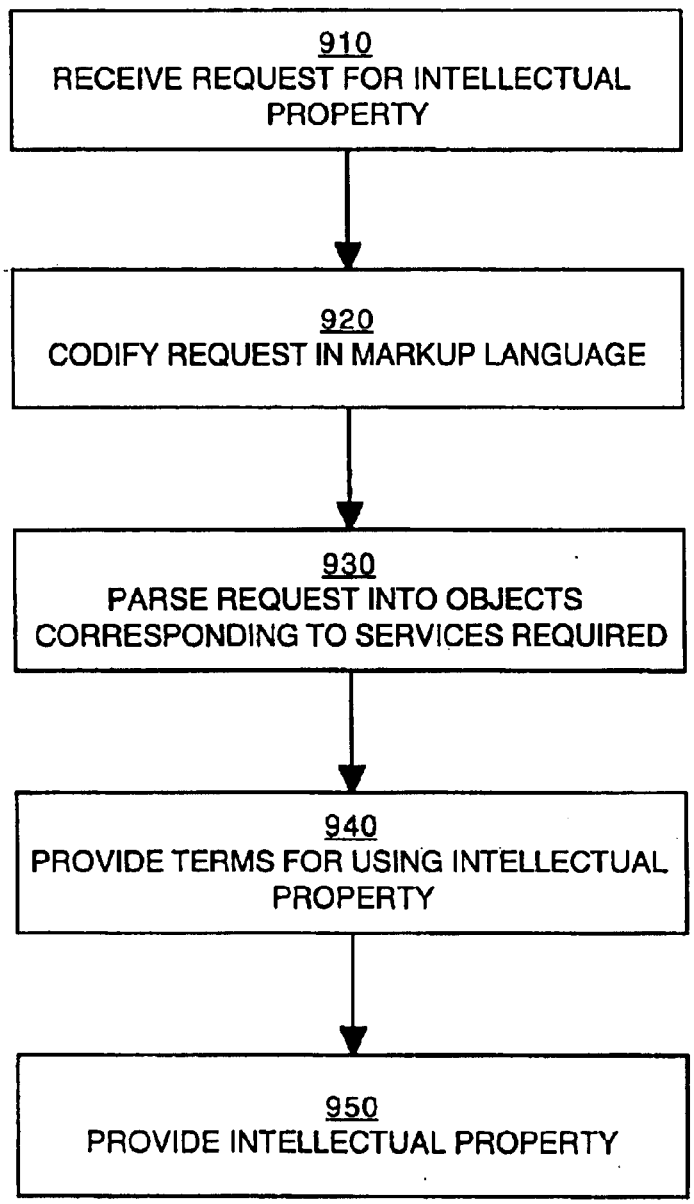
FIG. 9 is a flowchart of the steps in a process for distributing intellectual property over a non-IP network or system in accordance with one embodiment of the present invention.

Referring now to FIG. 8A, an intellectual property management system 800 is shown that includes an IP over IP engine that is communicatively coupled to IP to non-IP modules 810. In one embodiment of the present invention, a single IP to non IP gateway, represented by IP to non-IP gateway module 801 communicatively couples IP over IP engine 330a to various different types of non-IP networks or systems, represented by non-IP network or system 720a and non-IP network or system 720b. In one embodiment, IP to non-IP modules 810 of the present invention are separate from IP over IP engine 330a. However, alternatively, IP to non-IP modules 810 are integrally disposed within IP to IP engine 330a.

In one embodiment of the present invention, a plurality of separate gateways, represented by IP to non-IP gateway module 801, are used to couple to different networks and/or systems that do not use the Internet Protocol. That is, in the embodiment shown in FIG. 8A, a first gateway module 801 couples to non-IP network or system 720a and a second gateway module 801 couples to non-IP network or system 720b. In this embodiment, each gateway module 801 acts as an interface between IP over IP engine 330a and the respective non-IP network or system (e.g. non-IP network or system 720a and 720b) to which the gateway module is coupled. In one embodiment, a first gateway module communicatively couples to networks and systems that can communicate using an extensible markup language, represented by non-IP network or system 720a and a second gateway module communicatively couples to non-IP network or system 720b that cannot communicate using an extensible markup language.

Continuing with FIG. 8A, IP to non-IP modules 810 include non-XML version generator module 802 that generates embodiments and representations according to the present invention that are not coded in XML. Non-XML version generator module 802 is coupled to message encapsulation and transportation module 803. Message encapsulation and transportation module 803 provides for encapsulation of messages and transportation of messages, as required to allow for communication with non-IP network or system 720a and non-IP network or system 720b. IP to non-IP modules 810 also include delivery module 804 and error recovery module 805.

Figure 8B:
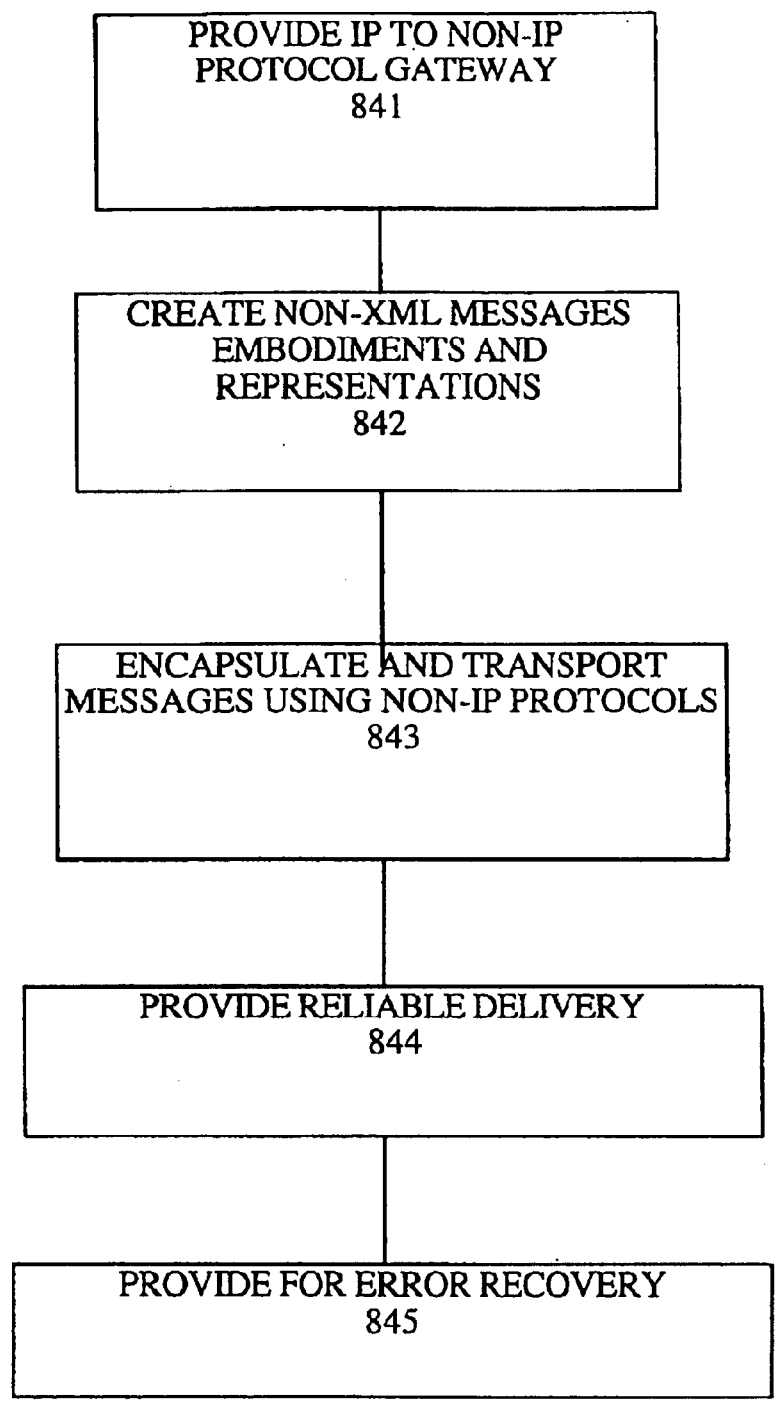
FIG. 8B is a block diagram showing steps of a method for coupling communications to a network or system that does not communicate using the Internet Protocol in accordance with one embodiment of the present invention.

Referring now to FIG. 8B, a method for implementing and controlling the electronic distribution of intellectual property over a network or system that uses a protocol other than the Internet Protocol are illustrated. Referring now to step 841, an IP to non-IP Protocol gateway is provided. In the embodiment shown in FIG. 8A, the IP to non IP Protocol gateway, represented by IP to non-IP Protocol gateway module 801, provides a physical interface between IP over IP engine 330a, and non-IP network or system 720a and 720b for enabling communication over the non-IP network or system 720a and 720b.

As shown by step 842, non XML embodiments and representations are created. That is, in response to requests from clients (e.g. clients 820a–820b), non-XML messages, in the form of embodiments and representations, are generated that are in a format suitable for transmission over the particular non-IP network or system and that are in a format suitable to viewing by the client making the request. In the present embodiment, such non-XML representations and embodiments include representations and embodiments simple ASCII, Unicode, either in original native or translated foreign language, analog or digital representations of various types, including human-language or bar code print outs or compressed or encrypted data files, various facsimile (fax) formats, other markup languages including but not limited to SGML, HTML, and their derivatives, PostScript, PCL, and other printer and printing device control languages, and other open and proprietary digital or analog data and markup embodiment and representation formats.

Continuing with FIG. 8B, as shown by step 843, messages are encapsulated and transported using non-IP Protocols. In the present embodiment, messages (e.g. embodiments and representations) that are to be transmitted over a non-IP network or system to a computer that can process XML messages are encapsulated such that the messages can be coupled over the non-IP network or system. Similarly, incoming messages that include encapsulated XML messages are unencapsulated, producing XML messages that are coupled to IP over IP engine 330a of FIG. 8. Examples of non-IP Protocols within which XML messages can be encapsulated include, for example, simple asynchronous transfer (Xmodem, Ymodem, Kermit, etc.), hubbed or bridged Asynchronous Transfer Mode (ATM), Ethernet, or Token Ring, NetBios, APPN, AppleTalk, Novell IPX, Frame Relay, or any other digital or analog encoding mechanism, packet or cell-based technology, etc.

Continuing with step 843, in the present embodiment, for messages, that are to be transmitted to a computer that cannot process XML, non-XML messages (that include, for example embodiments and representations) are generated pursuant to step 842. These non-XML messages are transported across the non-IP network or system to the user. That is, in the embodiment shown in FIG. 8A, non-XML version generator module 802 generates the required message, embodiment or representation that is transported via message encapsulation and transportation module 803 and via non-IP network or system 720a to client 820a, 820b. In a similar manner, incoming messages that are not in XML are converted into XML and are coupled to IP over IP engine 330a.

As shown by step 844, reliable delivery is provided. That is, levels of reliable delivery are provided independent of heterogeneous network protocols and topologies. In the embodiment shown in FIG. 8a, delivery module 804 provides for reliable delivery of messages.

As shown by step 845, error recovery is provided for. That is, levels of error recovery are provided for that are independent of heterogeneous network protocols and topologies. In the embodiment shown in FIG. 8A, error recovery module 805 provides for reliable error recovery and processes errors so as to assure reliable operation.

The embodiments of FIGS. 8A and 8B provide for transmission of messages, embodiments and representations relating to intellectual property in formats other than TCP/IP, HTTP, SMTP, and FTP. However, the embodiments of FIGS. 8A and 8B still allow for natively processing information using a native markup language (XML). Thereby, compatibility with native network devices and software is maintained.

FIG. 9 is a flowchart of the steps in a process 900 for distributing of intellectual property in accordance with one embodiment of the present invention. Process 900 can be implemented via computer-readable program instructions stored in a memory unit (e.g., random access memory 102, read-only memory 103, and/or data storage device 104) and executed by processor 101 of computer system 190 (FIG. 1A). In one embodiment, process 900 is implemented via a client-server computer system network (e.g., network 170 of FIG. 1B). In the present embodiment, process 900 is implemented and managed using IP/IP engine 330a in conjunction with IP to non-IP modules 810 of FIG. 8A.

In step 910 of FIG. 9, a client (e.g., client 820b of FIG. 8A) places an order or request (e.g., DLR 235 of FIG. 2) for intellectual property 202 (FIG. 2). In the present embodiment, the order is placed via a non-IP network or system (e.g. non-IP system 720, 720a, or 720b).

As shown by step 920 of FIG. 9, the request is codified into markup language. In the embodiment shown in FIG. 8A, the request is converted into markup language by IP to non-IP modules 810. More particularly, in the present embodiment, the request is converted into XML. The order is then coupled to IP over IP engine 330a. In one embodiment, the order is coupled via order entry unit 710 of FIG. 7, which can include an enterprise resource planner (e.g., ERP 615 of FIG. 6). In one embodiment of the present invention, IP to non-IP modules 810 of FIG. 8A work in conjunction with by ERP 615 or order entry unit 710 to convert the request into XML.

Provided below is an example of a digital license request (e.g., DLR 235 of FIG. 2) codified in XML in accordance with one embodiment of the present invention.

```
<LICENSEREQUESTS>
<DLR Type="StandardLicense">
    <Authorization Type="PSE" TimeIssued="DD-MMM-YYY">
        <PSE>
            <SalesOrder SalesOrderNumber="NNNNNNN" SalesOrderDate="DD-MMM-YYYY"/>
            <PurchaseOrder PurchaseOrderNumber="AAAAA" PurchaseOrderDate="DDD-MMM-YYYY"/>
            <DLA Type="EULA"/>
            <Order Type="Standard-NL"/>
        </PSE>
    </Authorization>
    <RequestingSystem>
        <HostName>[Host Name]</HostName>
        <ServerName>[Server Name]</ServerName>
        <Location>[Location]</Location>
    </RequestingSystem>
    <RequestingUser>
        <OrganizationName>ERP</OrganizationName>
        <UserName>[UserName]</UserName>
        <ContactEmailAddress>[Address]</ContactEmailAddress>
    </RequestingUser>
    <Product SubGroup="SCAN-PAK">
        <LindId>nnnnnnn>/LineId>
        <LineNumber>1</LineNumber>
        <InventoryItemId>mmmmmmm</InventoryItemId>
        <ProductName>SW-WC1.0</ProductName>
        <ProductDescription>WebClient user licese (initial minimum order)</ProductDescription>
        <OrderedQuantity>1</OrderedQuantity>
        <License>
            <SiteContact/>
            <OrganizationName>[Name]</OrganizationName>
            <Address>
                <StreetAddress>
                    <Line>
                </StreetAddress>
                <City/>
                <State/>
                <Province/>
                <Zip/>
                <Country/>
            </Address>
        </License>
        <Intermediary>
            <SiteContact>[Name]</SiteContact>
            <OrganizationName>[Name]</OrganizationName>
            <Address>
                <StreetAddress>
                    <Line>
                </StreetAddress>
                <City/>
                <State/>
                <Province/>
                <Zip/>
                <Country/>
            </Address>
        </Intermediary>
        <LicenseRequested>
            <PakParams/>
            <NumberOfLicenses>500</NumberOfLicenses>
            <LicenseParams/>
```

```
            <HostOS/>
            <HostName>[Name]</HostName>
            <HostId>nmnmnmn</HostId>
            <Pak/>
        </LicenseRequested>
        <LicenseDispatch>
            <EmailAddress>[Address]</EmailAddress>
            <OutboundDir/>
        </LicenseDispatch>
    </Product>
</DLR>
</LICENSEREQUESTS>
```

In step 930 of FIG. 9, the XML request is parsed into objects (e.g., by agent 620 of FIG. 6 or order processing unit 715 of FIG. 7). The objects correspond to various services that are needed to respond to and fulfill the request.

In step 940, the terms (e.g. conditions, legal rights, responsibilities and limitations) for using the intellectual property are provided. That is, in the embodiment shown in FIG. 8A, an electronic message that includes the terms for use of the requested intellectual property is generated by IP over IP engine 330*a*. IP to non-IP modules 610 convert the electronic message into a format compatible with the non-IP network or system (e.g. non-IP network or system 720*a* or 720*b* of FIG. 8A) and transmits the modified electronic message to the desired non-IP network or system (e.g. non-IP network or system 720*a* or 720*b* of FIG. 8A).

In one embodiment, the terms for using the intellectual property are provided in the form of a model digital license agreement that includes provision for the entry of information pertaining to the client and that includes modular components that can be accepted by the client. This modified digital license agreement can then be digitally signed and returned so as to create a digital license agreement upon acceptance by the vendor. Provided below is an example of a digital license agreement (e.g., DLA(e) 236 of FIG. 2) codified in XML in accordance with one embodiment of the present invention.

```
<DLA vesion="1.0">
    <License Type="[EULA|ILA]"
            Description="[End User License Agreement|Intermediary License Agreement]"
            DLANumber="[DLANumber]">
        <Authorization Type="PSE" Description="Product Sales Entitlement" TimeIssued="DD-MMM-YYYY">
            <PSE>
                <SalesOrder SONumber=""SODate=""/>
                <PurchaseOrder PONumber=""PODate+""/>
                <Order Type="[Resale|Internal]"/>
            </PSE>
        </Authorization>
        <Agreement>
            <Licensor>
            </Licensor>
            <Intermediary>
            </Intermediary>
            <Licensee>
            </Licensee>
        </Agreement>
        <TermsAndConditions>
            <LicensePeriod Type="[Perpetural|Limited]">
                <StartDate>[YYYY-MM-DDTHH:MM-GGGG]</StartDate>
                <TerminalDate>[YYYY-MM-DDTHH:MM-GGGG]</TerminalDate>
            </LicensePeriod>
        </TermsAndConditons>
        <ProductList>
            <Product
    ProductLineNo=""ProductName=""ProductDesc=""ProductQty=""ProductLicenseID="">
            </Product>
            <Product
    ProductLineNo=""ProductName=""ProductDesc=""ProductQty=""ProductLicenseID="">
                <ProductOrderAttributes>
                    <PakParams>         </PakParams>
                    <LicenseBlocks>[CSV numerical values]</LicenseBlocks>
                    <LicenseParams>    </LicenseParams>
                    <HostOS>            </HostOS>
                    <HostName>          </HostName>
                    <HostID>            </HostID>
                    <ChassisID>        </ChassisID>
                    <Pak>              </Pak>
                </ProductOrderAttributes>
            </Product>
```

-continued

```
        </ProductList>
        <LicenseKeyList>
            <LicenseKey ProductLicenseID="">
            <LicenseKeyDescription>[License Key Description</LicenseKeyDescription>
            <LicenseKeyValue>[License Key Value]</LicenseKeyValue>
            <LicenseKeyHref="[URI]">[Description of URI]</LicenseKeyHref>
        </LicenseKeyList>
        <InstallationInstructions ProductLicenseID="">
            <TextInstructionBlock>
            </TextInstructionBlock>
        </InstallationInstructions>
    </License>
</DLA>
```

Regarding the example digital license agreement codified above, the authorization key may be a public key, a digital certificate, or some other form of authentication. The "PSE" (Product Sales Entitlement) block represents the digital rights grant (e.g., DRG 216 of FIG. 2). The "intermediary" block is used in cases of an Intermediary License Agreement or a channel-delivered EULA (End User License Agreement). In the "terms and conditions" block, legal terms of the agreement are included and can be an ASCII text block, HTML (Hypertext Markup Language) or XML formatted text, or an external reference via URI to other local or remote documents. The terms and conditions are included for the elements listed in the "product list" block. The product list can be reiterated from the DLR. The products can include a list of character-data license key values or an external pointer to an associated file that contains license-related data. The "product license ID" attribute is a local file reference to the "license key" element.

In step 950 of FIG. 9, the commercial transfer of the intellectual property is accomplished by electronic transmission of the intellectual property right to the user (e.g. client 720a or client 720b of FIG. 8A) via a non-IP network or system. That is, referring to the embodiment shown in FIG. 8A the intellectual property right (e.g., license or assignment of title, or other commercial transfer for a software program, document, etc.), in digital format, is generated by IP over IP engine 330a. IP to non-IP modules 610 convert the intellectual property right into a format compatible with the non-IP network or system (e.g. non-IP network or system 720a or 720b of FIG. 8A) and transmits the intellectual property right, as modified by IP to non-IP modules 610, to the desired non-IP network or system (e.g. non-IP network or system 720a or 720b of FIG. 8A). The property itself can be transported in the same mechanism as the rights transfer, or can be delivered using separate transportation and delivery mechanisms. For instance, the rights or license or feature description of the property can be encoded within the property itself as it is transported across an IP or non-IP network.

Although process 900 is described in the context of a digital licensing agreement, it is appreciated that the process can be extrapolated to digital rights or rights assertions, claims, or inquiries (e.g., DRF 210 of FIG. 2) or digital feature format (e.g., DFF 220 of FIG. 2), as well as to other mechanisms that use the IP over IP framework such as metadata including "Dublin Core" data (e.g., claims of authorship, subject, title, etc.).

The present embodiment of the present invention can be used to assert information regarding the rights, responsibilities and other terms of use of intellectual property within the IP over IP framework. The present invention also allows interrogation of that information and responds to those interrogations. The present invention further allows for storage and transport of the intellectual property and the information regarding the rights, responsibilities and other terms of use of intellectual property.

The present embodiment of the present invention provides a method and system thereof for implementing and controlling the electronic distribution of intellectual property using Internet Protocol (e.g., an "IP over IP engine"). In accordance with the present invention, all forms of intellectual property can use a common series of extensible languages (e.g., XML) and control systems to request and respond to requests for access, control, ownership, rights of use or reuse, etc., and to enable network and automatic computerized actions regarding the distribution of the intellectual property once the rights of access have been established and accepted. For example, the intellectual property management system of the present invention can be applied to the distribution of software over the Internet.

Thus, the present invention provides a method and system that allows for communications relating to intellectual property and that allows for intellectual property transactions, including the proper negotiation and exchange of intellectual property, over computer systems and networks that do not communicate using Internet Protocol.

In addition to application in the software industry, the present invention can be extended to the telecommunications industry, which has embodiments and representations of rights of access or use of a network as well as intellectual properties such as pay-per-view movies and events. Similarly, the present invention can be extended to general content media properties, such as music or other audio, video and film, written literature, news, specialized data and information sources such as medical and financial records, and so on.

The present invention can be utilized over the Internet, as well as over internal company computer system networks (Intranets or the like) or using non-networked devices. The present invention can facilitate the legal and commercial aspects of intellectual property transactions, in order to reduce the delay in the delivery and use of the intellectual property by a purchaser or licensee, and to reduce the delay in the receipt of payments or royalties due to the seller or licensor.

The preferred embodiment of the present invention, intellectual property over Internet Protocol engine, is thus described. While the present invention has been described in particular embodiments, it should be appreciated that the present invention should not be construed as limited by such embodiments, but rather construed according to the following claims.

What is claimed is:

1. A method for implementing and controlling the electronic distribution of intellectual property over a network or system that uses a protocol other than Internet Protocol, said method comprising the computer-implemented steps of:
   a) receiving a request for an intellectual property, said request coupled over a network or system that uses a protocol other than Internet Protocol;
   b) providing an electronic version of said intellectual property in response to said request, said version of said intellectual property codified in a format compatible with said protocol other than Internet protocol;
   c) providing an electronic version of terms for using said intellectual property that is codified in a format compatible with said protocol other than Internet protocol; and
   d) providing access to said intellectual property and said terms, said access compatible with said protocol of said network such that said intellectual property and said terms are accessible over said network.

2. The method for implementing and controlling the electronic distribution of intellectual property over a network or system that uses a protocol other than Internet Protocol as recited in claim 1 wherein said electronic version of said intellectual property, and said electronic version of terms for using said intellectual property are provided using a markup language.

3. The method for implementing and controlling the electronic distribution of intellectual property over a network or system that uses a protocol other than Internet Protocol as recited in claim 1 wherein said electronic version of said intellectual property, and said electronic version of terms for using said intellectual property are provided using a markup language that is encapsulated using said protocol other than Internet protocol.

4. The method for implementing and controlling the electronic distribution of intellectual property over a network or system that uses a protocol other than Internet Protocol as recited in claim 1 wherein said step b) comprises:
   codifying said request into Extensible Markup Language.

5. The method for implementing and controlling the electronic distribution of intellectual property over a network or system that uses a protocol other than Internet Protocol as recited in claim 1 further comprising the step of:
   e) providing a gateway for coupling to said network or system that uses a protocol other than Internet Protocol.

6. The method for implementing and controlling the electronic distribution of intellectual property over a network or system that uses a protocol other than Internet Protocol as recited in claim 5 further comprising the step of:
   f) coding said electronic version of said intellectual property from Extensible Markup Language into a language that is compatible with said network or system that uses a protocol other than Internet protocol and that is transformable and interpretable to and from Extensible Markup Language; and
   g) coding said electronic version of said terms for using said intellectual property from Extensible Markup Language into a language that is compatible with said network or system that uses a protocol other than Internet protocol and that is transformable and interpretable to and from Extensible Markup Language.

7. The method for implementing and controlling the electronic distribution of intellectual property over a network or system that uses a protocol other than Internet Protocol as recited in claim 6, said method further comprising the steps of:
   h) transporting said electronic version of said intellectual property coded in step f) over a network or system that uses a protocol other than Internet Protocol; and
   i) transporting said electronic version of said terms for using said intellectual property coded in step g) over a network or system that uses a protocol other than Internet Protocol.

8. A computer system comprising:
   a bus;
   a processor coupled to said bus; and a memory unit coupled to said bus, said processor for executing a method for implementing and controlling the electronic distribution of intellectual property over a network or system that uses a protocol other than Internet Protocol, said method comprising the steps of:
   a) receiving a request for an intellectual property, said request coupled over a network or system that uses a protocol other than Internet Protocol;
   b) providing an electronic version of said intellectual property in response to said request, said version of said intellectual property codified in a format compatible with said protocol other than Internet protocol;
   c) providing an electronic version of terms for using said intellectual property that is codified in a format compatible with said protocol other than Internet protocol; and
   d) providing access to said intellectual property and said terms, said access compatible with said protocol of said network such that said intellectual property and said terms are accessible over said network.

9. The computer system of claim 8 wherein said processor performs said method for implementing and controlling the electronic distribution of intellectual property over a network or system that uses a protocol other than Internet Protocol and wherein said electronic version of said intellectual property, and said electronic version of terms for using said intellectual property are provided using a markup language.

10. The computer system of claim 8 wherein said processor performs said method for implementing and controlling the electronic distribution of intellectual property over a network or system that uses a protocol other than Internet Protocol and wherein said electronic version of said intellectual property, and said electronic version of terms for using said intellectual property are provided using Extensible Markup Language that is encapsulated using said protocol other than Internet protocol.

11. The computer system of claim 8 wherein said processor performs said method for implementing and controlling the electronic distribution of intellectual property over a network or system that uses a protocol other than Internet Protocol wherein said step b) further comprises:
   codifying said request into Extensible Markup Language.

12. The computer system of claim 8 wherein said processor performs said method for implementing and controlling the electronic distribution of intellectual property over a network or system that uses a protocol other than Internet Protocol, said method further comprising the step of:
   e) providing a gateway for coupling to said network or system that uses a protocol other than Internet Protocol.

13. The computer system of claim 12 wherein said processor performs said method for implementing and controlling the electronic distribution of intellectual property over a network or system that uses a protocol other than Internet Protocol, said method further comprising the steps of:

f) coding said electronic version of said intellectual property from Extensible Markup Language into a language that is compatible with said network or system that uses a protocol other than Internet protocol; and g) coding said electronic version of said terms for using said intellectual property from Extensible Markup Language into a language that is compatible with said network or system that uses a protocol other than Internet protocol.

14. The computer system of claim 13 wherein said processor performs said method for implementing and controlling the electronic distribution of intellectual property over a network or system that uses a protocol other than Internet Protocol, said method further comprising the steps of:

h) transporting said electronic version of said intellectual property coded in step f) over a network or system that uses a protocol other than Internet Protocol; and i) transporting said electronic version of said terms for using said intellectual property coded in step g) over a network or system that uses a protocol other than Internet Protocol.

15. A computer-usable medium having computer-readable program code embodied therein for causing a computer system to perform the steps of:

a) receiving a request for an intellectual property, said request coupled over a network or system that uses a protocol other than Internet Protocol;

b) providing an electronic version of said intellectual property in response to said request, said version of said intellectual property codified in a format compatible with said protocol other than Internet protocol;

c) providing an electronic version of terms for using said intellectual property that is codified in a format compatible with said protocol other than Internet protocol; and d) providing access to said intellectual property and said terms, said access compatible with said protocol of said network such that said intellectual property and said terms are accessible over said network.

16. The computer-usable medium of claim 15 wherein said electronic version of said intellectual property, and said electronic version of terms for using said intellectual property are provided using a markup language.

17. The computer-usable medium of claim 15 wherein said electronic version of said intellectual property, and said electronic version of terms for using said intellectual property are provided using Extensible Markup Language that is encapsulated using said protocol other than Internet protocol.

18. The computer-usable medium of claim 15 wherein said step b) further comprises:

codifying said request into Extensible Markup Language.

19. The computer-usable medium of claim 15 wherein said computer-readable program code embodied therein causes a computer system to perform the step of:

e) providing a gateway for coupling to said network or system that uses a protocol other than Internet Protocol.

20. The computer-usable medium of claim 19 wherein said computer-readable program code embodied therein causes a computer system to perform the steps of:

f) coding said electronic version of said intellectual property from Extensible Markup Language into a language that is compatible with said network or system that uses a protocol other than Internet protocol; and g) coding said electronic version of said terms for using said intellectual property from Extensible Markup Language into a language that is compatible with said network or system that uses a protocol other than Internet protocol.

21. The computer-usable medium of claim 20 wherein said computer-readable program code embodied therein causes a computer system to perform the steps of:

h) transporting said electronic version of said intellectual property coded in step f) over a network or system that uses a protocol other than Internet Protocol; and i) transporting said electronic version of said terms for using said intellectual property coded in step g) over a network or system that uses a protocol other than Internet Protocol.

* * * * *